United States Patent
Reihs

(10) Patent No.: US 8,697,234 B2
(45) Date of Patent: Apr. 15, 2014

(54) SELF-ASSEMBLED MONOLAYERS AND METHOD OF PRODUCTION

(75) Inventor: Karsten Reihs, Cologne (DE)

(73) Assignee: AMF GmbH, Cologne (DE)

( * ) Notice: Subject to any disclaimer, the term of this patent is extended or adjusted under 35 U.S.C. 154(b) by 384 days.

(21) Appl. No.: 12/991,875

(22) PCT Filed: May 11, 2009

(86) PCT No.: PCT/EP2009/003318
§ 371 (c)(1),
(2), (4) Date: Feb. 8, 2011

(87) PCT Pub. No.: WO2009/135686
PCT Pub. Date: Nov. 12, 2009

(65) Prior Publication Data
US 2011/0123812 A1    May 26, 2011

(30) Foreign Application Priority Data
May 9, 2008   (EP) .................................. 08008740

(51) Int. Cl.
*C09K 3/18*   (2006.01)
(52) U.S. Cl.
USPC .......................................... 428/333; 428/421
(58) Field of Classification Search
None
See application file for complete search history.

(56) References Cited

U.S. PATENT DOCUMENTS

| | | | |
|---|---|---|---|
| 6,299,981 B1 | 10/2001 | Azzopardi et al. | |
| 6,340,502 B1 | 1/2002 | Azzopardi et al. | |

FOREIGN PATENT DOCUMENTS

| | | |
|---|---|---|
| EP | 0477805 A1 | 4/1992 |
| EP | 0484746 A2 | 5/1992 |
| EP | 0491251 A1 | 6/1992 |
| EP | 0492417 A2 | 7/1992 |
| EP | 0492545 A2 | 7/1992 |
| EP | 0525598 A1 | 2/1993 |

OTHER PUBLICATIONS

Chechik, V., Crooks, R.M., and Stirling, C.J.M., "Reactions and Reactivity in Self-Assembled Monolayers", Advanced Materials, Aug. 2000, pp. 1161-1171, vol. 12, No. 16.
Hanley, L., Kornienko, O., Ada, E.T., Fuoco, E., and Trevor, J.L "Surface Mass Spectrometry of Molecular Species", Journal of Mass Spectrometry, 1999, pp. 705-723, No. 34.
Canry, J.C. and Vickerman, J.C., "Mixed Self-Assembled Monolayers of Dodecanethiol and Octadecanethiol on Silver and Gold: A TOF-Sims Investigation", 6th European Conference on Applications of Surface and Interface Analysis, Oct. 1995, 5 pgs.
Wenzel, Robert N., "Resistance of Solid Surfaces to Wetting by Water", Industrial and Engineering Chemistry, Aug. 1936, pp. 988-993, vol. 28, No. 8.
Arezki, B.; Delcorte, A; Garrison, B. J.; Bertrand, P., "Understanding Gold-Thiolate Cluster Emission from Self-assembled Monolayers upon Kiloelectronvolt Ion Bombadment", J. Phys. Chem. B, 2006, 110, 6832.

*Primary Examiner* — Ramsey Zacharia
(74) *Attorney, Agent, or Firm* — McNees Wallace & Nurick LLC

(57) ABSTRACT

The invention relates to a self-assembled monolayer comprising fluoroalkyl chains $F_3C-(CF_2)_m-(CH_2)_n-$ of differing length, wherein m is an integer of from 3 to 36, n is an integer of from 0 to 40, and m in the longer fluoroalkyl chain is larger than m in the shorter fluoroalkyl chain by at least 2, preferably by at least 8. The molar ratio of the longer fluoroalkyl chains to the shorter fluoroalkyl chains is from 1:9 to 9:1.

7 Claims, 3 Drawing Sheets

SELF-ASSEMBLED MONOLAYERS AND METHOD OF PRODUCTION

FIELD OF THE INVENTION

The present invention relates to self-assembled monolayers, a composition for preparing self-assembled monolayers, and a process for forming self-assembled monolayers on a substrate.

BACKGROUND OF INVENTION

Surfaces having both hydrophobic and oleophobic properties are known as amphiphobic surfaces. The amphiphobic surfaces are characterized by advancing contact angles for water as well as for long chain n-alkanes, such as n-decane, of more than 90° when processed into a flat non-structured surface. Amphiphobic surfaces having high contact angles, for example 120° or higher in the case of water, are very advantageous technically because, for example, they cannot be wetted with water or oil. Dirt particles adhere poorly to these surfaces. The surfaces are highly contamination-resistant because contaminated liquid droplets is slide off the surface and do not evaporate on the surface avoiding stains or spots at the surface.

Various methods for the production of hydrophobic and/or oleophobic surfaces are known in the art. It has been a common practice for improving the water- and oil-repelling properties of a substrate to coat it with a fluorocarbon-based polymer. Other examples of agents which are known to impart hydrophobic and/or oleophobic properties are fluorinated alkylsilanes.

The treatment of a substrate with a single fluorinated alkylsilane is described in, for instance, documents U.S. Pat. No. 6,299,981 B1, EP 0 492 417 A2, EP 0 484 746 A2, EP 0 492 545 A2, and EP 0 525 598 A1.

U.S. Pat. No. 6,340,502 B1 relates to a process for forming a hydrophobic/oleophobic coating on a substrate, preferably glass, by applying a composition containing at least one alkoxysilane and at least one halosilane, each having a perfluorinated group at least one end of their molecule. In the specific embodiment described the coating solution comprises $F_3C(CF_2)_7(CH_2)_2Si(OC_2H_5)_3$ and $F_3C(CF_2)_7(CH_2)_2SiCl_3$ having carbon chains with identical lengths. The water contact angles of the obtained coated substrates are between 105° and 109° which is not very high.

EP 0 477 805 A1 concerns the production of a durable water repellent surface on glass substrates by treatment with a perfluoroalkylalkylene silane in combination with a fluorinated olefin telomer. In the examples a perfluoroalkyl ethylene trichlorosilane composition comprising a range of perfluoroalkyl chains $CF_3(CF_2)_n$ is used, wherein the average n=9.0 and the approximate distribution is $C_6$=6 percent, $C_8$=50 percent, $C_{10}$=29 percent, $C_{12}$=11 percent and $C_{14+}$=4 percent. The distribution of the different perfluoroalkyl groups in the deposited coating is not disclosed. Depending on the substrates on which the perfluoroalkyl ethylene trichlorosilanes in combination with the perfluoroalkyl ethylenes are applied a broad range of water contact angles from 84° to 112° is reported.

EP 0 491 251 A1 relates to a method of forming a monomolecular film of fluorine-containing molecules on a substrate surface. The film comprises at least two different molecules having alkylfluoride groups of different lengths. The two different molecules not only have different molecular lengths, but also belong to different types of compounds selected from the group consisting of $$F(CF_2)_m(CH_2)_nSi(R_q)(O_{3-q})$$ [I]

where m represents an integer ranging from 1 to 15, n represents an integer ranging from 0 to 15, the sum of m and n ranges from 10 to 30, q represents an integer ranging from 0 to 2, and R represents an alkyl group or an alkoxyl group, and $$F(CF_2)_s(CH_2)_tA(CH_2)_pSi(R_q)(O_{3-q})$$ [II]

where s represents an integer ranging from 1 to 8, t represents an integer ranging from 0 to 2, p represents an integer ranging from 5 to 25, q represents an integer ranging from 0 to 2, A represents a member of a groups consisting of an oxy group, a carbonyl group, a carboxyl-ester group and dimethylsilene group, and R represents an alkyl group or an alkoxyl group. In the embodiment of EP 0 491 251 A1 relating to a singularly adsorbed monomolecular film that is formed directly on a glass surface the two different silanes are used in the coating solution in a mixing ratio of 1:1. Although it is described that the obtained glass surface has sufficient water- and oil-repelling properties, no contact angles are disclosed. Exceptionally high water-wetting angles of from 140° to 150° are only reported for a multilayer coating wherein an additional inner monomolecular film is covalently bonded to the outer monomolecular film comprising the alkyl fluoride groups, said multilayer coating being obtained by a complicated process.

Due to the versatile technical applicability of amphiphobic surfaces there is an ongoing demand for new and efficient methods for preparing those surfaces. It is thus an object of the present invention to provide new types of amphiphobic surfaces and simple methods for preparing those surfaces, preferable by using easily available precursors.

BRIEF DESCRIPTION OF THE INVENTION

The object is met by a self-assembled monolayer comprising at least two different molecules (1a) and (2a) each having a fluoroalkyl chain $F_3C\text{—}(CF_2)_m\text{—}(CH_2)_n\text{—}$, with m being an integer of from 3 to 36 and n being an integer independently selected from 0 to 40, wherein m in molecule (2a) is larger than m in molecule (1a) by at least 2, and the molar ratio of molecules (1a) to (2a) in the monolayer is from 1:9 to 9:1.

An alternate solution to the above problem is a self-assembled monolayer comprising a molecule having two different fluoroalkyl chains $F_3C\text{—}(CF_2)_{m'}\text{—}(CH_2)_{n'}\text{—}$ and $F_3C\text{—}(CF_2)_{m''}\text{—}(CH_2)_{n''}\text{—}$, wherein m' is an integer of from 3 to 34 and m'' is an integer of from 5 to 36, with the proviso that m'' is larger than m' by at least 2, and n' and n'' are integers independently selected from 0 to 40.

Another aspect of the present invention are liquid or gaseous compositions for preparing the self-assembled monolayers. The present invention is thus directed to a liquid or gaseous composition comprising at least two different fluorinated compounds (1) and (2) according to the same generic formula $$F_3C\text{—}(CF_2)_m\text{—}(CH_2)_n\text{—}X$$ (A)

wherein
m is an integer of from 3 to 36, with the proviso that m in compound (2) is larger than m in molecule (1) by at least 8;
n is an integer independently selected from 0 to 40,
X is the same in both compounds (1) and (2) and is a monovalent inorganic or organic moiety containing at least one functionality;
and the molar ratio of compounds (1) to (2) in the composition is from 1:100 to 100:1.

The present invention is also directed to a liquid or gaseous composition comprising a fluorinated compound according to the formula

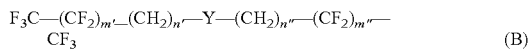

$$F_3C—(CF_2)_{m'}—(CH_2)_{n'}—Y—(CH_2)_{n''}—(CF_2)_{m''}—CF_3 \quad (B)$$

wherein m' and m" are integers of from 3 to 36, with the proviso that m" is larger than m' by at least 2;

n' and n" are integers independently selected from 0 to 40, and

Y is a divalent inorganic or organic moiety containing at least one functionality.

The present invention further concerns the use of the above composition to prepare a self-assembled monolayer.

Yet another aspect of the present invention is a coated article comprising a substrate and the self-assembled monolayer.

Yet another aspect of the present invention is a process for forming the self-assembled monolayer on a substrate, which process comprises applying to the substrate a liquid or gaseous composition comprising (A) at least two different fluorinated compounds (1) and (2) according to the same generic formula

$$F_3C—(CF_2)_m—(CH_2)_n—X \quad (A)$$

wherein m is an integer of from 3 to 36, preferably 7 to 36, with the provison that m in compound (2) is larger than m in molecule (1) by at least 2, n is an integer independently selected from 0 to 40, preferably 2 to 40, and X is a monovalent inorganic or organic moiety containing at least one functionality being capable of bonding to the substrate; or (B) a fluorinated compound according to the formula

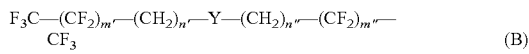

$$F_3C—(CF_2)_{m'}—(CH_2)_{n'}—Y—(CH_2)_{n''}—(CF_2)_{m''}—CF_3 \quad (B)$$

wherein m' is an integer of from 3 to 34, preferably 7 to 34, and m" is an integer of from 5 to 36, preferably 9 to 36, with the proviso that m" is larger than m' by at least 2;

n' and n" are integers independently selected from 0 to 40, preferably 2 to 40, and Y is a divalent inorganic or organic moiety containing at least one functionality being capable of bonding to the substrate.

DETAILED DESCRIPTION OF THE INVENTION

When the above liquid or gaseous compositions are applied to a clean substrate according to standard methods well known to a person skilled in the art a self-assembled monolayer comprising fluoroalkyl chains $F_3C—(CF_2)_m—(CH_2)_n—$ of differing length is formed. The self-assembled monolayer according to the first embodiment of the present invention comprises at least two different molecules (1a) and (2a) which can be derived from compounds (1) and (2), respectively, and have a fluoroalkyl chain $F_3C—(CF_2)_m—(CH_2)_n—$, wherein the perfluoroalkyl chains $F_3C—(CF_2)_m—$ in molecules (1a) and (2a) differ from each other by at least 2 carbon atoms, preferably by at least 4 carbon atoms, more preferably by at least 6 carbon atoms, and most preferably by at least 8 carbon atoms. For example, the perfluoroalkyl chains may differ by 2, 4, 6, 8, 10, 12, 14, 16, 18, 20, 22 or 24 carbon atoms.

In the fluoroalkyl chain $F_3C—(CF_2)_m—(CH_2)_n—$ m is an integer of from 3 to 36, preferably 7 to 36, and n is an integer independently selected from 0 to 40, preferably 2 to 40. It is preferred that n differs in both molecules by 4 or less, more preferably by 2 or less and most preferably n is the same in molecules (1a) and (2a). In one embodiment m is an integer of from 3 to 33, n is an integer of from 2 to 40, and n is the same in molecules (1a) and (2a).

The molar ratio of molecules (1a) to (2a) in the monolayer ranges from 1:9 to 9:1, preferably from 1:4 to 4:1, more preferably from 3:7 to 7:3, even more preferably from 2:3 to 3:2, and is most preferably about 1:1. The observance of these molar ratios is crucial to attain a favorable topography of the monolayer.

Analytical studies of the self-assembled monolayers, e.g. by static secondary ion mass spectrometry (SSIMS), have shown that the short and long molecules (1a) and (2a) are randomly mixed on a molecular level. As a result, a surface topography with molecular roughness is obtained. The larger the length difference of the perfluoroalkyl chains the rougher is the surface. The arrangement of the short and long chains of the same kind causes a dense packing of the molecules. Such monolayers have amphiphobic properties with high contact angles for liquids. Specifically, the advancing water contact angle of the inventive monolayer comprising at least two different molecules is increased compared to the advancing water contact angles of monolayers prepared from the single components.

In fact, it is surprising that the mixture of the different fluorinated compounds results in a random distribution of the molecules in the monolayer because previous research on mixed compositions of non-fluorinated n-alkane thiols on Au has shown that they separate into nanometer-scale domains of each component in the monolayer obtained ("Nanometer-scale phase separation in mixed composition self-assembled monolayers" by S. G. Stranic et al., Nanotechnology 7, (1996), 438-442). Without being bound to this theory, it is assumed that the fluorinated chains in the monolayer of the present invention form helical structures that stabilize intramolecularly and have less stabilizing intermolecular interactions thus reducing their propensity for phase segregation.

Typically, the fluoroalkyl chain of the molecules in the self-assembled monolayer according to the present invention is linked to a O, S, Se, Te, C, Si, N, or P atom. Preferably, molecules (1a) and (2a) of the present self-assembled monolayer comprise a fluoroalkyl chain $F_3C—(CF_2)_m—(CH_2)_n—$ linked to an inorganic or organic moiety which is the same in molecules (1a) and (2a). In this case the O, S, Se, Te, C, Si, N, or P atom is part of the inorganic or organic moiety. The fluoroalkyl chains of the molecules are then all linked to the same type of atom. The inorganic or organic moiety accomplishes the adsorption (bonding) to the substrate. Depending on the type of compounds used in the composition to prepare the inventive monolayer the O, S, Se, Te, C, Si, N, or P atoms are bond to the substrate directly or via further atoms being also part of the inorganic or organic moiety.

The nature of the bonding to the substrate is not important for the present invention. The molecules may be adsorbed via a covalent or an ionic bond (including intermediate forms) or by means of hydrogen bonds or dipole interaction, depending on the type of molecules, or more specifically of the type of inorganic or organic moiety, and of the type of substrate. As used herein in the context of the monolayer, the term "molecule" thus includes both "complete molecules" (e.g. ionically bond to the substrate or by means of hydrogen bonds or dipole interaction) and "molecular residues" that are covalently bond to the substrate.

Instead of having at least two different molecules in the self-assembled monolayer (first embodiment), in an alternative embodiment (second embodiment) the self-assembled monolayer comprises a molecule having two different fluoroalkyl chains $F_3C-(CF_2)_{m'}-(CH_2)_{n'}-$ and $F_3C-(CF_2)_{m''}-(CH_2)_{n''}-$, wherein m' is an integer of from 3 to 34, preferably 7 to 34, and m" is an integer of from 5 to 36, preferably 9 to 36, with the proviso that m" is larger than m' by at least 2, and n' and n" are integers independently selected from 0 to 40, preferably 2 to 40. As described for the first embodiment the perfluoroalkyl chains differ from each other by at least 2 carbon atoms, preferably by at least 4 carbon atoms, more preferably by at least 6 carbon atoms, and most preferably by at least 8 carbon atoms. For example, the perfluoroalkyl chains may differ by 2, 4, 6, 8, 10, 12, 14, 16, 18, 20, 22 or 24 carbon atoms.

It is preferred that n' and n" differ from each other by 4 or less, more preferably by 2 or less and most preferably n'=n". In one embodiment m' is an integer of from 3 to 31, m" is an integer of from 5 to 33 and n' and n" are integers of from 2 to 40, preferably n'=n".

As in the first embodiment the fluoroalkyl chains of the molecules in the self-assembled monolayer are linked to a O, S, Se, Te, C, Si, N, or P atom. Preferably, both fluoroalkyl chains are linked to one and the same inorganic or organic moiety. In this case the O, S, Se, Te, C, Si, N, or P atom(s) is (are) part of the inorganic or organic moiety. The two fluoroalkyl chains of the molecules may be linked to one atom or to two different atoms (of the same or different type) in the inorganic or organic moiety. As in the first embodiment the inorganic or organic moiety accomplishes the adsorption (bonding) to the substrate and the explanations concerning the bonding in the first embodiment equally apply to the second embodiment.

Both embodiments of the present invention can be described as a self-assembled monolayer comprising fluoroalkyl chains $F_3C-(CF_2)_m-(CH_2)_n-$ of differing length, wherein m is an integer of from 3 to 36, n is an integer of from 0 to 40, and m in the longer fluoroalkyl chains is larger than m in the shorter fluoroalkyl chains by at least 2, preferably by at least 8; including the preferences described above with respect to the individual embodiments. The molar ratio of the longer fluoroalkyl chains to the shorter fluoroalkyl chains is from 1:9 to 9:1.

The self-assembled monolayer according the first embodiment may be prepared from a liquid or gaseous composition comprising at least two different fluorinated compounds (1) and (2) according to the same generic formula $$F_3C-(CF_2)_m-(CH_2)_n-X \quad (A)$$

wherein
m is an integer of from 3 to 36, preferably 7 to 36, with the provison that m in compound (2) is larger than m in molecule (1) by at least 2;
n is an integer independently selected from 0 to 40, preferably 2 to 40,
X is the same in both compounds (1) and (2) and is a monovalent inorganic or organic moiety containing at least one functionality;
and the molar ratio of compounds (1) to (2) in the composition is from 1:100 to 100:1, preferably from 20:1 to 0.5:1, more preferably from 7:1 to 1.7:1, and most preferably from 5:1 to 2.5:1.

The perfluoroalkyl chains $F_3C-(CF_2)_m-$ in compounds (1) and (2) differ from each other by at least 2 carbon atoms, preferably by at least 4 carbon atoms, more preferably by at least 6 carbon atoms, and most preferably by at least 8 carbon atoms. For example, the perfluoroalkyl chains may differ by 2, 4, 6, 8, 10, 12, 14, 16, 18, 20, 22 or 24 carbon atoms. Compositions wherein the perfluoroalkyl chains $F_3C-(CF_2)_m-$ in compounds (1) and (2) differ from each other by at least 8 carbon atoms are not known from the prior art and are thus also the subject-matter of the present invention including the preferred embodiments described above.

It is preferred that n differs in both compounds by 4 or less, more preferably by 2 or less and most preferably n is the same in compounds (1) and (2). In one embodiment m is an integer of from 3 to 33, n is an integer of from 2 to 40, and n is the same in compounds (1) and (2).

The self-assembled monolayer according the second embodiment may be prepared from a liquid or gaseous composition comprising a fluorinated compound according to the formula $$F_3C-(CF_2)_{m'}-(CH_2)_{n'}-Y-(CH_2)_{n''}-(CF_2)_{m''}-CF_3 \quad (B)$$

wherein
wherein m' is an integer of from 3 to 34, preferably 7 to 34, and m" is an integer of from 5 to 36, preferably 9 to 36, with the proviso that m" is larger than m' by at least 2;
n' and n" are integers independently selected from 0 to 40, preferably 2 to 40; and
Y is a divalent inorganic or organic moiety containing at least one functionality.

The perfluoroalkyl chains differ from each other by at least 2 carbon atoms, preferably by at least 4 carbon atoms, more preferably by at least 6 carbon atoms, and most preferably by at least 8 carbon atoms. For example, the perfluoroalkyl chains may differ by 2, 4, 6, 8, 10, 12, 14, 16, 18, 20, 22 or 24 carbon atoms.

It is preferred that n' and n" differ from each other by 4 or less, more preferably by 2 or less and most preferably n'=n". In one embodiment m' is an integer of from 3 to 31, m" is an integer of from 5 to 33 and n' and n" are integers of from 2 to 40, preferably n'=n".

Preferably, the inorganic or organic moieties X and Y comprises at least one member selected from O, S, Se, Te, C, Si, N, and P atoms.

More preferably, X comprises at least one functionality selected from —SH; —COOH; —SiZ$_k$R$^1_{3-k}$ with Z being Cl, OR$^1$ or OH, R$^1$ being alkyl, preferably C$_1$ to C$_4$ alkyl, and k being 1, 2 or 3; —SO$_3$H; —OSO$_3$H; —OP(O)(OR$^2$)$_2$; —P(O)(OR$^2$)$_2$ with R$^2$ being independently selected from hydrogen or alkyl, preferably C$_1$ to C$_4$ alkyl (e.g. methyl, ethyl, propyl or butyl); —NR$^3_2$ and —NR$^3_3{}^+$ with R$^3$ being independently selected from hydrogen, —OH, and organic radicals such as alkyl, preferably C$_1$ to C$_4$ alkyl (e.g. methyl, ethyl, propyl or butyl) and alkyl, preferably C$_1$ to C$_4$ alkyl (e.g. methyl, ethyl, propyl or butyl), substituted with —OH, —COOH, —SO$_3$H, —OSO$_3$H or —NH$_2$; and —OR$^4$ with R$^4$ being hydrogen or alkyl, preferably C$_1$ to C$_4$ alkyl (e.g. methyl, ethyl, propyl or butyl); including the deprotonated forms of the foregoing groups having acidic character.

It is preferred that Y comprises at least one functionality selected from —S—S—; —OP(O)(OR$^2$)O—; —P(O)(OR$^2$)O— with R$^2$ being independently selected from hydrogen or alkyl; and —NR$^3$— with R$^3$ being independently selected from hydrogen, —OH and organic radicals such as alkyl, preferably C$_1$ to C$_4$ alkyl (e.g. methyl, ethyl, propyl or butyl) and alkyl, preferably C$_1$ to C$_4$ alkyl (e.g. methyl, ethyl, propyl or butyl) substituted with —OH, —COOH, —SO$_3$H, —OSO$_3$H and/or —NH$_2$; including the salt forms of the foregoing groups.

The functional groups are either linked directly to the fluoroalkyl chain (in this case X or Y correspond to the functional group) or via spacer groups of varying structures and lengths (in this case X or Y comprise at least one spacer group and at least one functional group). If Y comprises a divalent functionality, for example selected from those mentioned above, it preferably comprises either no or two spacer groups and each fluoroalkyl chain is linked to the functional group via the same spacer group. For example, the spacer group may comprise fluoroalkylene such as —$CF_2CH_2$—, —$CHFCF_2$— and branched perfluoroalkylene groups e.g. —$CF(CF_3)$—; oxyalkylene such as oxyethylene; poly(oxyalkylene) such as poly(oxyethylene); oxyfluoroalkylene such as oxyfluoroethylene, preferably oxyperfluoroalkylene such as oxyperfluoroethylene, oxyperfluoropropylene (oxyhexafluoropropylene —$OCF(CF_3)CF_2$— and —$OCF_2CF(CF_3)$—); poly(oxyfluoroalkylene) such as poly(oxyfluoroethylene), preferably poly(oxyperfluoroalkylene) such as poly(oxyperfluoroethylene) and poly(oxyperfluoropropylene); hydroxy substituted oxyalkylene such as hydroxy substituted oxypropylen (e.g. —$OCH_2CH(CH_2OH)$—); hydroxy substituted poly(oxyalkylene) such as hydroxy substituted poly(oxypropylene); thioalkylene (—S-alkylene) such as thioethylene; —CR=CR— with R being independently selected from hydrogen, alkyl and (per)fluoroalkyl, e.g. —$CH=C(CF_3)$—; —CR=CR-alkylene with R being independently selected from hydrogen, fluoro, alkyl and (per)fluoroalkyl, e.g. —CH=CH-alkylene and —CF=CH-alkylene; oxyarylene, preferably —O—$C_6H_4$—; arylene, preferably —$C_6H_4$—; hydroxy substituted alkylene such as hydroxy substituted methylene and ethylene, e.g. —$CH(CH_2OH)$— and —CH(OH)$CH_2$—; —O—CO—R substituted alkylene with R being alkyl, e.g. —$CH(OCOCH_3)$—; —NR-alkylene and —$N^+R_2$-alkylene with R being independently selected from hydrogen and an organic radical, preferably alkyl e.g. methyl and ethyl; —CO—; —O—CO-alkylene; —CO—NR-alkylene with R being hydrogen or alkyl e.g. methyl and ethyl; —NR—CO—NR-alkylene with R being independently selected from hydrogen or alkyl such as methyl and ethyl; —$SO_2$—NR-alkylene with R being hydrogen or an organic radical, preferably alkyl, e.g. methyl and ethyl; —$SO_2$—O-alkylene; —O—$SO_2$—O-alkylene; and combinations thereof.

Alternatively, the fluoroalkyl chains may be linked to the functionality of the divalent inorganic or organic moiety Y via a trivalent spacer group. In these cases Y comprises a trivalent spacer group and a monovalent functional group, for example selected from those mentioned above with respect to the monovalent inorganic moiety X. Exemplary moieties Y comprising a trivalent spacer group and a monovalent functional group are derived from functionalized succinates, e.g. sulfosuccinates.

Generally, the inorganic or organic moiety X or Y is linked to the fluoroalkyl chain via a O, S, Se, Te, C, Si, N, or P atom being part of the inorganic or organic moiety X or Y.

In some embodiments X and Y do not contain any Si atoms, i.e. the compounds of the present liquid or gaseous composition are free of silicon and accordingly, the molecules forming the self-assembled monolayer are free of silicon.

The inorganic or organic moieties X and Y are selected depending on the type of substrate to be coated with the self-assembled monolayer, i.e. they are selected to result in a good adsorption on the substrate as it is known to the person skilled in the art.

Typically, the compounds of the present liquid or gaseous compositions are is surface active agents (surfactants).

In the following $R_f$ stands for the perfluoroalkyl chain $F_3C$—$(CF_2)_m$— being part of the fluoroalkyl chain $F_3C$—$(CF_2)_m$—$(CH_2)_m$— as defined above.

Illustrative compounds for use in liquid or gaseous composition according to the first embodiments of the present invention include:

perfluoroalkanoic acids $R_f$—COOH and their salts;
fluorinated alkanoic acids $R_f$—$CH_2$—$(CF_2CH_2)_x$COOH and their salts with x being from 1 to 30 and $R_f$—$(CH_2)_x$COOH and their salts with x being from 1 to 30;
fluorinated alkenoic acids $R_f$—CH=CH$(CH_2)_x$COOH and their salts with x being from 1 to 30;
perfluoroalkoxyalkanoic acids $R_f$—O$(CH_2)_x$COOH and their salts with x being from 1 to 30;
perfluoroalkylethyleneoxyalkanoic acids $R_f$—$CH_2CH_2O(CH_2)_x$COOH and their salts with x being from 1 to 30, e.g. x=2;
perfluoroalkoxybenzoic acids $R_f$—$OC_6H_4$COOH and their salts;
$R_f$—$CH_2CH_2SCH_2CH_2$COOH and their salts;
perfluoroacylaminoalkanoic acids $R_f$—CONH$(CH_2)_x$COOH and their salts, e.g. $Na^+$ or $NH_4^+$ with x being from 1 to 30, e.g. x=5,
perfluoroalkane sulfonic acids $R_f$—$SO_3H$ and their salts, e.g. ammonium $NH_4^+$, tetraethylammonium $N(C_2H_5)_4^+$, and $R_2N(CH_2CH_2OH)_2^+$ with R=alkyl, e.g. $C_1$ to $C_4$ alkyl;
perfluoroalkylethane sulfonic acids $R_f$—$CH_2CH_2SO_3H$ and their salts, e.g. $NH_4^+$;
perfluoroalkylbenzene sulfonic acids $R_f$—$C_6H_4SO_3H$ and their salts;
perfluoroaalkoxybenzene sulfonic acids $R_f$—$OC_6H_4SO_3H$ and their salts;
perfluoroacylbenzene sulfonic acids $R_f$—$OC_6H_4SO_3H$ and their salts;
$R_f$—$CH_2CH_2SCH_2CH_2CONHC(CH_3)_2CH_2SO_3H$ and their salts;
$R_f$—$SO_2NH(CH_2)_3N(CH_3)CONH(CH_2)_2SO_3H$ and their salts;
$R_f$—CONR$(CH_2)_3SO_3H$ and their salts with R=alkyl, e.g. $C_1$ to $C_4$ alkyl;
$R_f$—$[OCF(CF_3)CF_2]_xOArSO_3H$ and their salts with Ar=arylene, e.g. phenylene, and x being from 1 to 30;
$R_f$—$CF_2CF(CF_3)[OCF_2CF(CF_3)]_xOCF_2CF_2SO_3H$ and their salts with x being from 0 to 30;
perfluoroalkylether sulfonic acids $R_f$—$OCF_2CF_2SO_3H$ and their salts;
perfluoroalkyl sulfocarboxylates $R_f$—$CH_2OCOC_xH_{2x}SO_3H$ and their salts with x being from 1 to 30; e.g. x=3 or 4 (e.g. perfluoroalkyl sulfobutyrates $R_f$—$CH_2$—O—CO—CH$(CH_3)CH_2SO_3H$)
$R_f$—$(CH_2)_x(OC_2H_4)_yOSO_3H$ and their salts with x being from 1 to 30; e.g. x=1 or 7, and y being from 1 to 20, e.g. y=5;
perfluoroalkylated methyl sulphates and their salts $R_f$—$CH_2OSO_3H$;
fluorinated aminosulfates such as $R_f$—$SO_2NH(CH_2)_3NH(CH_2)_3NHCH_2CH_2OSO_3H$ and their salts;
$R_f$—SH;
$R_f$—$(CH_2)_x$—SH with x being from 1 to 30, e.g. x=2;
perfluoroalkylethyl dihydrogen phosphates $R_f$—$CH_2CH_2OP(O)(OH)_2$ and their salts;
mono- and bis(fluoroalkyl) phosphate amine salts ($R_f$—$CH_2CH_2O)_pPO[(OH)NH(C_2H_4OH)_2]_q$ with p+q=3;
$R_f$—CH=$C(CF_3)OPO(OH)_2$ and their salts;
(perfluoroalkyl) glycol monophosphates $R_f$—CH(OH)$CH_2OP(O)(OH)_2$ and
$R_f$—$CH(CH_2OH)OP(O)(OH)_2$ and their salts;
$R_f$—$CH_2CH_2S(CH_2)_3OP(O)(OC_2H_5)_2$,
$R_f$—$SO_2N(C_2H_5)CH_2CH_2OP(O)(OH)$;

Cationic Fluorinated Surfactants:
$R_f$—$CH_2CH_2N(CH_3)_2C_2H_5^+A^-$ with $A^-$ being a monovalent anion, e.g. iodide;

$R_f$—$CH_2NH(CH_2)_2N(CH_3)_3{}^+A^-$ with $A^-$ being a monovalent anion, e.g. chloride or iodide;

$R_f$—$CONH(CH_2)_3N(CH_3)_3{}^+A^-$ with $A^-$ being a monovalent anion, e.g. chloride or iodide;

$R_f$—$OC_3F_6OCF(CF_3)CONH(CH_2)_3N(CH_3)_3{}^+A^-$ with $A^-$ being a monovalent anion, e.g. chloride or iodide;

$R_f$—$CONHCH_2CH_2CH_2N(OH)(CH_3)_2{}^+A^-$ with $A^-$ being a monovalent anion, e.g. $HOCH_2COO^-$ $R_f$—$SO_2NH(CH_2)_3N(CH_3)_3{}^+A^-$ with $A^-$ being a monovalent anion, e.g. chloride or iodide;

$R_f$—$(CH_2)_xS(CH_2)_yN(CH_3)_2CH_2COOH^+A^-$ with $A^-$ being a monovalent anion, e.g. chloride or iodide;

$R_f$—$SO_2O(CH_2)_3N(CH_3)_3{}^+A^-$ with $A^-$ being a monovalent anion, e.g. chloride or iodide;

Amphoteric Fluorinated Surfactants:
Carboxybetaines:
$R_f$—$CH_2CH(OOCCH_3)CH_2N^+(CH_3)_2CH_2COO^-$;
$R_f$—$CH_2CH(OH)CH_2N^+(CH_3)_2CH_2COO^-$;
$R_f$—$CH_2CH(OCOCH_3)CH_2N^+(CH_3)_2CH_2COO^-$;
$R_f$—$CONH(CH_2)_3O(CH_2)_2N^+(CH_3)_2CH_2COO^-$;
$R_f$—$CH_2CH_2SCH_2CH_2N^+(CH_3)_2CH_2COO^-$;
$R_f$—$CH_2CH_2SCH_2CF(OH)CH_2N^+H(CH_3)CH_2COO^-$;
p-$R_f$—$OC_6H_4SO_2NH(CH_2)_3N^+(CH_3)_2CH_2COO^-$;

Perfluoroalkyletheramidoalkyl Betaines
$R_f$—$OCF(CF_3)CF_2OCF(CF_3)CONH(CH_2)_3N^+(CH_3)_2CH_2COO^-$;

Sulfobetaines
$R_f$—$CH_2CH_2CONH(CH_2)_3N^+(CH_3)_2CH_2CH_2CH_2SO_3{}^-$;
$R_f$—$OC_6H_4CONH(CH_2)_6N^+(CH_3)_2CH_2CH_2CH_2SO_3{}^-$;

Sulfatobetaines:
$R_f$—$CF$=$CHCH_2N^+(CH_3)_2CH_2CH_2OSO_3{}^-$;
$R_f$—$CH_2CH_2SCH_2CH(OSO_3{}^-)CH_2N^+(CH_3)_3$;

Trianion-Type Amphoteric Fluorinated Surfactants
$R_f$—$CONH(CH_2)_3N^+(C_2H_4OH)(CH_2COOH)_2CH_2COO^-$;
$R_f$—$SO_2NHCH_2CH(OH)CH_2N^+CH_3[CH_2CH(OH)CH_2SO_3Na]_2$ $A^-$ with $A^-$ being a monovalent anion, e.g. chloride or iodide;
$R_f$—$SO_2NHCH_2CH_2CH_2N^+CH_3(CH_2CH_2CH_2SO_3Na)_2$ $A^-$ with $A^-$ being a monovalent anion, e.g. chloride or iodide;
$R_f$—$CH_2(OCH_2CH_2)_xOH$ with x being from 1 to 20;
$R_f$—$CH_2CH_2(OCH_2CH_2)_xOH$ with x being from 1 to 20;
$R_f$—$(CH_2)_x(OCH_2CH_2)_yOH$ with x being from 1 to 30 and y being from 1 to 20;
$R_f$—$CH_2CH(OH)CH_2OC_2H_5$, Fluorinated Polyhydric Alcohols:
$R_f$—$C_2H_4[OCH_2CH(CH_2OH)]_xOH$ with x being from 1 to 10;
$R_f$—$C_2H_4SO_2NHCH_2CH(CH_2OH)[OCH_2CH(CH_2OH)]_xOH$ with x being from 0 to 10;
$R_f$—$CH_2CH_2SCH_2CH_2(OCH_2CH_2)_xOH$ with x being from 0 to 20, e.g. x=2;
$R_f$—$CH_2CH_2SCH_2CH(OH)CH_2(OCH_2CH_2)_xOCH_3$ with x being from 1 to 20;
$R_f$—$C_2H_4SCH_2CH_2(OCH_2CH_2)_xOC_2H_4SCH_2CH_2(OCH_2CH_2)_yOH$ with x being from 0 to 20 and y being from 0 to 20;
$R_f$—$CONHCH_2CH_2(OCH_2CH_2)_xOH$ with x being from 0 to 20; e.g. x=1 to 3;
$R_f$—$CONH(CH_2)_3N(CH_2CH_2OH)_2$;
$R_f$—$CH_2CON[(CH_2CH_2(OCH_2CH_2)_xOCH_3]_2$ with x being from 0 to 20;
$R_f$—$CH_2CH_2SO_2N(CH_3)CH_2CH_2OH$;
$R_f$—$CHFCF_2SO_2N[CH_2CH_2(OCH_2CH_2)_xOH]_2$ with x being from 0 to 20;
$R_f$—$SO_2N(CH_3)CO(OCH_2CH_2)_xOC_4H_9$ with x being from 1 to 20; and $R_f$—$OC_6H_4SO_2N(C_2H_5)CH_2CH_2(OCH_2CH_2)_xOH$ with x being from 0 to 20.

Illustrative compounds for use in liquid or gaseous composition according to the second embodiments of the present invention include:

fluorinated disulfides $R_f$—$(CH_2)_n$—$S$—$S$—$(CH_2)_n$—$R_f$ with n being from 1 to 30, e.g. n=2;
$[R_f$—$CH_2CH_2O]_2P(O)(OH)$;
$[R_f$—$SO_2N(C_2H_5)CH_2CH_2O]_2P(O)OH$;
$[R_f$—$CH(OH)CH_2]_2NCH_2CH_2NH_2.H_2SO_4$;
fluorinated sulfosuccinates such as $R_f$—$C_2H_4OCOCH(SO_3Na)CH_2COOC_2H_4$—$R_f$; and
$(R_f)_2$—$CFO(CH_2)_6OSO_3H$.

The liquid or gaseous composition used in the first embodiment of the present invention comprises at least two different fluorinated compounds (1) and (2) which differ in their perfluoroalkyl chain lengths by at least 2 carbon atoms. It is preferred that the compounds (1) and (2) belong to the same type described by a generic formula selected from $F_3C$—$(CF_2)_m$—$(CH_2)_n$—$SH$ (i), $F_3C$—$(CF_2)_m$—$(CH_2)_n$—$COOH$ (ii), $F_3C$—$(CF_2)_m$—$(CH_2)_n$—$SO_3H$ (iii), $F_3C$—$(CF_2)_m$—$(CF_2)_n$—$OSO_3H$ (iv), $F_3C$—$(CF_2)_m$—$(CH_2)_n$—$OP(O)(OH)_2$ (v), $F_3C$—$(CF_2)_m(CH_2)_n$—$NH_2$ (vi), and $F_3C$—$(CF_2)_m$—$(CH_2)_n$—$SiZ_kR^1{}_{3-k}$ (vii), wherein m is an integer of from 3 to 33, preferably from 5 to 27, and more preferably from 7 to 27;

n is the same in (1) and (2) and is an integer of from 2 to 40, preferably from 2 to 30, more preferably from 2 to 20, even more preferably from 2 to 12; and most preferably n=2;

Z is Cl, OR or OH; R is alkyl, preferably $C_1$ to $C_4$ alkyl; and k is 1, 2 or 3. m in compound (2) is larger than m in compound (1) by at least 2 carbon atoms, preferably by at least 4 carbon atoms, more preferably by at least 6 carbon atoms, and most preferably by at least 8 carbon atoms. For example, m is 7 in compound (1) and m is 9 in compound (2); or m is 7 in compound (1) and m is 11 in compound (2); or m is 7 in compound (1) and m is 17 in compound (2); or m is 7 in compound (1) and m is 23 in compound (2).

The monolayer comprising the specific fluoroalkyl chains as specified herein are supposed to be more regular and more densely packed than those described in EP 0 491 251 A1 discussed above. The monomolecular film prepared in the example of EP 0 491 251 A1 comprises different types of chains which does not allow a dense packing. One type are $CF_3$—$CH_2O$—$(CH_2)_{15}$ chains which only comprise a $CF_3$-group at the end of a long non-fluorinated alkyl chain. Such chains are not supposed to form stabilized helical structures, but take on less defined conformations. The molecular ratio of the different molecules in the final monomolecular film is not disclosed in EP 0 491 251 A1. However, it is essential for the formation of a regular monolayer that the molar ratio is from 1:9 to 9:1 as specified in the present invention.

The fluorinated compounds comprised in the present composition belong to one type of compounds having the same functional group as visible in the generic formulas (i) to (vii). The functional group effects the bonding of the molecules in the monolayer to the substrate. Some of the fluorinated compounds according to the generic formulas (i) to (vii) are commercially available, especially those comprising up to 12 carbon atoms. Often, the fluorinated compounds are not available in pure form but in form of mixtures of compounds with varying carbon chain lengths. It is within the normal skill of a practitioner to separate the compounds by standard separation methods. Fluorinated compounds that are not commercially available may be synthesized according to customary routes well known to a person skilled in the art.

In one embodiment the at least two different fluorinated compounds (1) and (2) are thiols according to formula $F_3C$—$(CF_2)_m$—$(CH_2)_n$—$SH$ (i) and silanes $F_3C$—$(CF_2)_m$—$(CH_2)_n$—$Si(OCH_2CH_3)_3$ with m and n as defined above. Preferably, n=2.

Exemplary liquid or gaseous compositions for use herein comprise
- (a) $CF_3$—$(CF_2)_7$—$CH_2$—$CH_2$—$SH$ (compound (1)) and $CF_3$—$(CF_2)_9$—$CH_2$—$CH_2$—$SH$ (compound (2)), or
- (b) $CF_3$—$(CF_2)_7$—$CH_2$—$CH_2$—$SH$ (compound (1)) and $CF_3$—$(CF_2)_{17}$—$CH_2$—$CH_2$—$SH$ (compound (2)), or
- (c) $CF_3$—$(CF_2)_7$—$CH_2$—$CH_2$—$SH$ (compound (1)) and $CF_3$—$(CF_2)_{23}$—$CH_2$—$CH_2$—$SH$ (compound (2)), or
- (d) $CF_3$—$(CF_2)_7$—$CH_2$—$CH_2$—$Si(OCH_2CH_3)_3$ (compound (1)) and $CF_3$—$(CF_2)_{11}$—$CH_{12}$—$CH_2$—$Si(OCH_2CH_3)_3$ (compound (2)), or
- (e) $CF_3$—$(CF_2)_7$—$CH_2$—$CH_2$—$S$—$CH_2$—$CH_2$—$(CF_2)_{15}$—$CF_3$; or
- (f) $CF_3$—$(CF_2)_7$—$CH_2$—$CH_2$—$S$—$CH_2$—$CH_2$—$(CF_2)_{17}$—$CF_3$.

The composition according to the present invention may be in the liquid or gaseous phase. In one embodiment it is in the liquid phase and comprises a solvent for the fluorinated compounds. Accordingly, the fluorinated compounds are dissolved in the solvent. The solvent is a non-aqueous solvent and exemplary solvents include alcohols such as ethanol, methanol, and tetrahydrofuran, methyl lisobutyl ketone; halocarbons such as $C_6F_{14}$; halohydrocarbons such as $CHCl_3$, $CH_2Cl_2$, and $C_6H_5$—$CF_3$, halogenated alcohols such as $CF_3$—$CH_2$—$OH$, and $CF_3$—$CHOH$—$CF_3$; hydrocarbons such as n-hexadecane, toluene, and xylene; and mixtures thereof. Of course, the choice of the appropriate solvent depends on the type of fluorinated compound to be dissolved. The solvents must have high purity, especially they must be free of water, and it is further advantageous to reduce the amount of oxygen that may be dissolved in the solvent e.g. by saturation with an inert gas. Typically, analytical grade solvents are used. For fluorinated thiols absolute ethanol and $CF_3$—$CHOH$—$CF_3$ are the preferred solvents.

In one embodiment of the present invention the liquid composition is a solution of
- (a) $CF_3$—$(CF_2)_7$—$CH_2$—$CH_2$—$SH$ (compound (1)) and $CF_3$—$(CF_2)_9$—$CH_2$—$CH_2$—$SH$ (compound (2) in ethanol; or
- (b) $CF_3$—$(CF_2)_7$—$CH_2$—$CH_2$—$SH$ (compound (1)) and $CF_3$—$(CF_2)_{17}$—$CH_2$—$CH_2$—$SH$ (compound (2)) in $CF_3$—$CHOH$—$CF_3$; or
- (c) $CF_3$—$(CF_2)_7$—$CH_2$—$CH_2$—$SH$ (compound (1)) and $CF_3$—$(CF_2)_{23}$—$CH_2$—$CH_2$—$SH$ (compound (2)) in $CF_3$—$CHOH$—$CF_3$;
- (e) $CF_3$—$(CF_2)_7$—$CH_2$—$CH_2$—$S$—$CH_2$—$CH_2$—$(CF_2)_{15}$—$CF_3$ in $CF_3$—$CHOH$—$CF_3$; or
- (f) $CF_3$—$(CF_2)_7$—$CH_2$—$CH_2$—$S$—$CH_2$—$CH_2$—$(CF_2)_{17}$—$CF_3$ in $CF_3$—$CHOH$—$CF_3$.

The process for preparing the above-described self-assembled monolayer on a substrate comprises applying the liquid or gaseous composition comprising the at least two different fluorinated compounds on a substrate. In order to obtain a molar ratio of molecules (1a) to (2a) in the inventive monolayer of from 1:9 to 9:1, or the preferred ratios described above, an appropriate molar ratio of compound (1) to compound (2) in the liquid or gaseous composition according to the present invention must be provided. It has been observed that a certain molar ratio of compounds (1) to (2) in the composition to be applied to the substrate only rarely results in a monolayer having the identical molar ratio of molecules (1a) and (2a) as generally one compound is adsorbed preferentially. The preference of one of the molecules is governed by both kinetic and thermodynamic effects. Whether the shorter or longer compound is adsorbed preferentially and the extent of preference depend on various factors such as type of compounds, difference in perfluoroalkyl chain lengths, type of substrate, deposition conditions e.g. whether it is deposited from the liquid or gaseous phase, etc. No general rule to determine the appropriate molar ratio of compounds (1) and (2) in the composition can be laid down.

It is preferred to determine the appropriate molar ratio of compound (1) to compound (2) in the liquid or gaseous composition according to the present invention by preliminary tests under process conditions and extrapolation. In the preliminary tests, it is preferred to apply at least three different compositions which comprise compounds (1) and (2) in an equimolar ratio and in a lower and a higher ratio, e.g. 1:5 and 5:1. The composition of the resulting monolayer on the substrate is examined by any appropriate analytical method and a graph showing the molar ratios of the molecules (1a) and (2a) in the self-assembled monolayer as a function of the molar ratios of the compounds (1) and (2) in the compositions applied can be obtained form the at least three measuring points. Of course, more measuring points will allow a more accurate extrapolation. Any molar ratio of the compounds (1) and (2) in the composition leading to a molar ratio of the molecules (1a) and (2a) in the monolayer within the required range of from 1:9 to 9:1, or preferred ratios described above, is appropriate. It is understood that the preliminary tests must be conducted under the same conditions as the process itself, meaning that all parameters apart from the molar ratio such as for example substrate, liquid or gaseous phase, solvent, temperature, and pressure must be kept constant.

A suitable analytical tool to determine the composition of the present monolayers is static secondary ion mass spectrometry (SSIMS), namely because of its surface sensitivity which is confined to the uppermost layer of the surface, and secondly because fluorinated alky compounds display extremely high secondary ion yields, that is, they provide for extremely high signal to noise ratios especially for negatively charged secondary ions. Finally the technique yields parent ions and a broad variety of different fragments ions which deliver quantitative information of the molecular structure of the uppermost layer of the surface (see L. Hanley et al, J. Mass Spectrom 34, 705 (1999)).

In a preferred embodiment the liquid or gaseous composition comprises at least two different fluorinated compounds as described and is free of any other compounds that may be adsorbed on a substrate and form part of the monolayer. Accordingly, it is preferred that the self-assembled monolayer is free of any molecules not having a fluoroalkyl chain as herein specified. In one embodiment of the present invention the liquid or gaseous composition comprises exactly two different fluorinated compounds. However, the liquid or gaseous composition may comprise additional fluorinated compounds as specified above. In this case, the molar ratio for each pair of compounds must be adapted to meet the required molar ratio of the corresponding molecules in the monolayer. For example, if the liquid or gaseous composition comprises three different fluorinated compounds (1), (2) and (3), the molar ratio of compounds (1) to (2), the molar ratio of compounds (1) to (3), and the molar ratio of compounds (2) to (3) must all be adapted to meet the required molar ratio of the corresponding pairs of molecules in the monolayer.

The process for forming the self-assembled monolayer on the substrate typically comprises a cleaning step prior to the application of the liquid or gaseous composition. In the cleaning step the substrate is thoroughly cleaned according to standard methods, e.g plasma etching or rinsing with appropriate agents. A cleaning step is not necessary, if the substrate is freshly prepared (e.g. by vacuum sputter deposition of metal layers onto a substrate).

The substrate may optionally be blown dry with a stream of clean gas before the liquid or gaseous composition according to the present invention is applied.

The composition is applied to the substrate according to conventional methods to form monolayers from liquid or gaseous compositions. Methods for adsorption from solution are well known to the person skilled in the art and comprise contacting the substrate with the solution, e.g. by immersing the substrate into the solution. Depending on the molecules that are to be deposited, the solution may be optionally tempered. After the deposition process is completed (depending on the system this time varies between minutes and several days) the substrates are preferably rinsed thoroughly by one or more different high-purity solvents and optionally blown dry with a stream of high-purity and filtered gas.

Methods for deposition from the gas phase are also well known to the person skilled in the art. Typically, the substrates are then mounted in a deposition chamber which is optionally pumped out by vacuum pumps depending on the desired base pressure. Optionally, the substrates are pretreated in the chamber. The compounds to be adsorbed are then fed into the chamber from a pre-mixed gaseous supply, or individually from single compound vapor supplies. Optionally, additional reactive compounds that assist during deposition are supplied. The compounds may be supplied statically, or delivered by a continuous gas flow into the chamber while the gas is pumped off simultaneously. Depending on the molecules that are to be deposited, the substrate may be optionally tempered. After the deposition process is completed the substrates are optionally cleaned.

The self-assembled monolayer according to the present invention can be prepared on a variety of substrates such as metals, ceramics, plastics, and glass.

Preferred metals are selected from Al, Mg, Mn, Ti, Va, Cr, Fe, Co, Ni, Cu, Zn, Ga, Zr, Pd, Ag, In, Sn, Ta, Hg, W, Pt, Au, and alloys thereof. More preferably, the metals are selected from Al, Ti, Cu, Ag, Au, and alloys of these metals among themselves and alloys of these metals with Hg. Examples of suitable ceramic materials are silicon dioxide; metal oxides, metal carbides, and metal nitrides, especially of the metals mentioned above. Mixtures (compounds) of the ceramic materials may also be used.

In one embodiment a composition comprising fluorinated thiols according to formula (i) or a disulfide is applied on Au. In the resulting monolayer the fluoroalkyl chains are linked to a S atom and the S atoms are bonded to the Au substrate.

The present invention is now illustrated by way of examples which should not be construed as limiting the scope of the appended claims.

EXAMPLES

Preparation of Silicon Substrates

Polished Si (100) test wafers (Aurel GmbH, Germany), 125 mm diameter, 625 µm thick) were cut to 43×43 mm samples. They were cleaned with "piranha solution" (concentrated $H_2SO_4$/30% $H_2O_2$ in 7:3 volume ratio) at 90° C. for 60 min, rinsed copiously with deionized water, rinsed with absolute ethanol, and blown dry in a stream of nitrogen (purity 4.6).

Sputtering of Ti and Au Layer

A sputter deposition of 20 nm Ti (target 99.5%, FHR GmbH, Germany) is immediately followed by 200 nm Au (target 99.99%, FHR GmbH, Germany) without breaking the vacuum (base pressure<$5×10^{-7}$ mbar in a turbomolecular pumped system). The metals were sputter-deposited by a 13.8 MHz radio frequency argon plasma (argon: 99.9997%, pressure $3×10^{-3}$ mbar) from 200 mm diameter metal targets at a deposition rate of 0.35 nm/sec (Ti) and 1.1 nm/sec (Au). The samples were mounted on two trays of 11 and 5 samples each, that were transferred into the vacuum through an air lock one after the other, pumped overnight and deposited in two back-to-back deposition processes.

Monolayer Preparation

Example 1

The monolayer preparations were performed in screw neck glass vials that were previously cleaned with "piranha solution" (concentrated $H_2SO_4$/30% $H_2O_2$ in 7:3 volume ratio) at 90° C. for 30 min, rinsed with copious amounts of deionized water, and dried in an oven at 200° C. for 12 hours. The adsorption solution was prepared by dissolving the pure thiols $F_3C-(CF_2)_7-CH_2-CH_2-SH$ ("F8H—SH" in the following) and $F_3C-(CF_2)_9-CH_2-CH_2-SH$ ("F10H2-SH" in the following) or various binary mixtures thereof in absolute ethanol, deoxygenated with nitrogen gas (99.996%). The thiols were obtained from Fluorous Technologies Inc. The total concentration of the pure thiols or the binary mixtures in the ethanol was 1 mM.

Immediately after Au deposition the substrates were taken out of the vacuum and were put into adsorption solution. Adsorption was performed for 6 hours at room temperature followed by 60 hours at 60° C. in the same solution. The films were then rinsed with a sequence of dichloromethane, toluene, and absolute ethanol (100 ml each, p.a.), and dried under a stream of nitrogen (purity 4.6). Samples were then individually sealed in dark containers under nitrogen (purity 4.6) and stored at room temperature. All sample characterization was performed within 10 days after preparation.

Example 2

Another monolayer was prepared using a procedure according to Example 1. Here, the monolayer was prepared from a solution of 1 mM total concentration of the thiols $F_3C-(CF_2)_7-CH_2-CH_2-SH$ (F8H2-SH) and $F_3C-(CF_2)_{17}-CH_2-CH_2-SH$ (F18H2-SH) in $CF_3-CHOH-CF_3$. The concentration ratio of the thiols in solution was R=[F18H2-SH]/[F8H2-SH]=0.06 yielding a molar fraction of F8H2 groups of x(F8H2)=0.61. An advancing contact angle for water of $\theta_a=134°$ was obtained.

Example 3

According to Example 2 a monolayer was prepared from a solution of 1 mM total concentration of the thiols $F_3C-(CF_2)_7-CH_2-CH_2-SH$ (F8H2-SH) and $F_3C-(CF_2)_{23}-CH_2-CH_2-SH$ (F24H2-SH) in $CF_3-CHOH-CF_3$. The concentration ratio of the thiols in solution was R=[F24H2-SH]/[F8H2-SH]=0.01 yielding a molar fraction of F8H2 groups of x(F8H2)=0.66. An advancing contact angle for water of $\theta_a=149°$ was obtained.

Example 4

Silane monolayers were prepared according to a general procedure reported in P. W. Hoffmann, M. Stelzle and J. F. Rabolt, Langmuir 13, 1977 (1997). Silicon substrates were prepared as described above and mounted in a UHV hot-wall chemical vapour deposition reactor (base pressure $1\times10^{-8}$ mbar). The chamber was evacuated to $1\times10^{-7}$ mbar and heated to 80° C. for 30 min followed by a plasma cleaning process using a 350 kHz radio frequency oxygen plasma (feed gas purity 4.5, flow rate 100 sccm, pressure 0.4 mbar, 250 W total r.f. power) for 5 minutes. Subsequently the samples were treated by water vapour at 500 mbar for 30 minutes at 80° C. After removal of the water vapour the temperature was raised to 130° C. and the reactor was pumped for 2 hours. A mixture of $F_3C$—$(CF_2)_7$—$CH_2$—$CH_2$—$Si(OCH_2CH_3)_3$ (F8H2-SiOEt3) and $F_3C$—$(CF_2)_7$—$CH_2$—$CH_2$—$Si(OCH_2CH_3)_3$ (F12H2-SiOEt3) of a total pressure of $5.0\times10^{-2}$ mbar and a pressure ratio of 1:1 was adsorbed at 130° C. for 180 minutes. To remove the silane excess the reactor was purged with argon several times and finally pumped at 130° C. for 180 min before the samples were taken out. The composition of the monolayer consisted of a molar fraction of 0.50 for F8H2 groups, the advancing contact angle for water was $\theta_a=123°$.

Example 5

According to Example 4 a monolayer was prepared from a mixture of $F_3C$—$(CF_2)_7$—$CH_2$—$CH_2$—$Si(OCH_2CH_3)_3$ (F8H2-SiOEt3) and $F_3C$—$(CF_2)_{17}$—$CH_2$—$CH_2$—$Si(OCH_2CH_3)_3$ (F18H2-SiOEt3) of a total pressure of $3.0\times10^{-2}$ mbar and a pressure ratio of 1:1 yielding a molar fraction of F8H2 groups of x(F8H2)=0.6 and an advancing contact angle for water of $\theta_a=131°$.

Example 6

According to Example 2 a monolayer was prepared from a solution of 1 mM total concentration of the disulfide $F_3C$—$(CF_2)_7$—$CH_2$—$CH_2$—$S$—$S$—$CH_2$—$CH_2$—$(CF_2)_{17}$—$CF_3$ (F8H2-SS—F18H2) in $CF_3$—$CHOH$—$CF_3$. An advancing contact angle for water of $\theta_a=136°$ was obtained.

Example 7

According to Example 2 a monolayer was prepared from a solution of 0.2 mM total concentration of the disulfide $F_3C$—$(CF_2)_7$—$CH_2$—$CH_2$—$S$—$S$—$CH_2$—$CH_2$—$(CF_2)_{15}$—$CF_3$ (F8H2-SS—F16H2) in $CF_3$—$CHOH$—$CF_3$. An advancing contact angle for water of $\theta_a=132°$ was obtained.

Characterization of Monolayer

Static secondary ion mass spectrometry (SSIMS):

The compositions of the monolayers were calculated on the basis of SSIMS measurements (see L. Hanley et al, J. Mass Spectrom 34, 705 (1999); Canry, J.-C.; Vickerman, J. C.; Proceedings of the 6th European Conference on Applications of Surface and Interface Analysis, ECASIA 95, H. J. Mathieu, B. Reihl, D. Briggs, Eds.; John Wiley & Sons Ltd., Chicester, 1995, p 903). Molecular surface characterization was performed by static time-of-flight secondary ion mass spectrometry (TOF-SSIMS) using a 10 keV $Ar^+$ pulsed primary ion beam (1 pA raster-scanned over an area of $100\times100$ $\mu m^2$, pulse width 1.3 nsec) in a TOF-SIMS IV instrument (ION-TOF, Germany). Data were acquired over a mass range of m/z=0 to 3500 for both positive and negative secondary ions. The total ion dose density used to acquire each spectrum was $6\times10^{12}$ $cm^{-2}$. Spectra of negative secondary ions were analyzed in detail. The mass scale for the negative secondary ions was calibrated using C, CH, $CH_2$, OH, Au and $Au_2$ peaks. The mass resolution for negative ions was typically $\Delta m/m=12,500$ at m/z=131.

Advancing Contact Angle Measurement:

The advancing contact angle for water of each of the samples was measured on a OCA 20 contact angle goniometer (DataPhysics, Germany) by using sessile drops under the following conditions: calibrated by contact angles standard (Data Physics) with lithographic Young-Laplace contour shape of sessile water drop with contact angle of 120°, glass capillary, 100 µm O.D.; Tangent leaning; 20 µl droplets, advancing +5 µl at 0.053 µl/s; water for purging taken out after each measurement; temperature during measurements 23.0° C. within ±0.5° C., relative humidity 25.6% within ±3.5% (controlled and monitored). The advancing contact angles were obtained from contours at the time when the three-phase contact point moved upon increasing the volume of the droplet. The average contact angles were obtained from at least 8 measurements at different positions of each sample.

Figure 1:
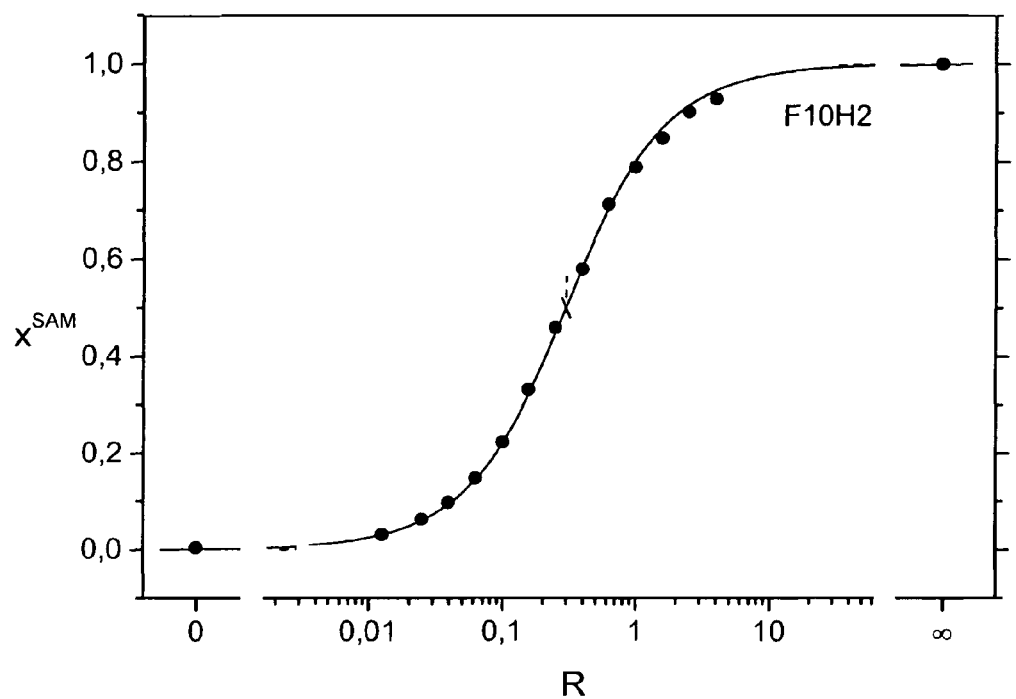
FIG. 1 shows the molar fraction $x_{F10H2}$ of the F10H2 chain in the binary mixed monolayers as a function of the concentration ratio R=[F10H2-SH]/[F8H2-SH] of the thiols F10H2-SH and F8H2-SH in the adsorption solution.

From FIG. 1 it is evident that in this example the ideal equimolar ratio of F10H2 to F8H8 chains in the monolayer corresponds to a concentration ratio R=[F10H2-SH]/[F8H2-SH]=0.3 in the adsorption solution.

Figure 2:
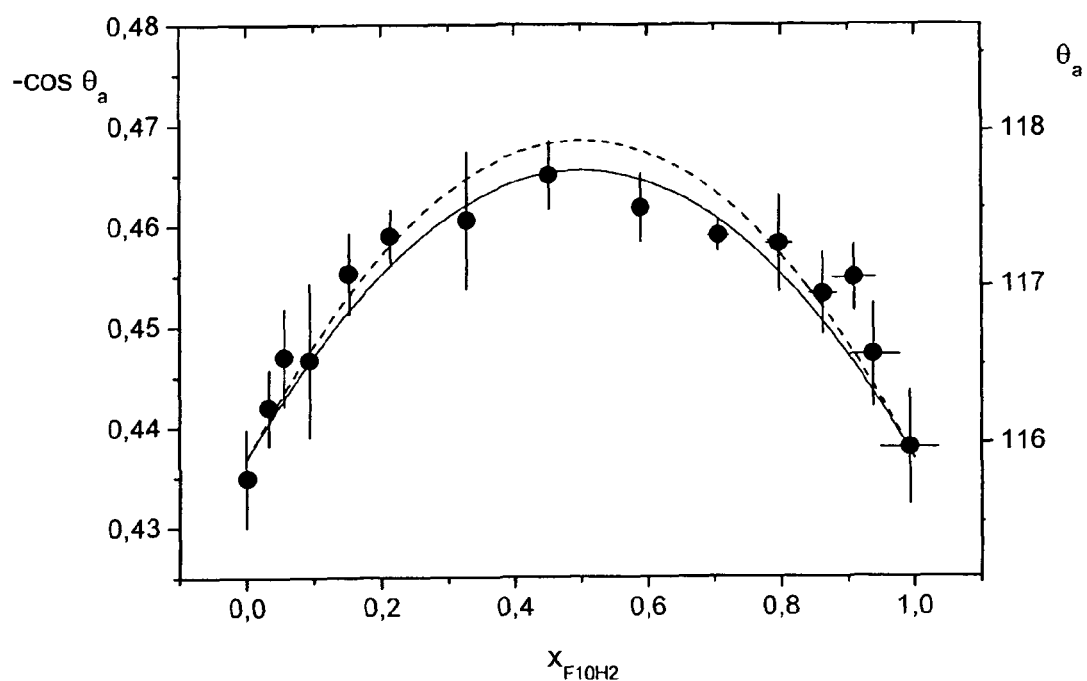
FIG. 2 shows the advancing contact angle $\theta_a$ for water of the binary mixed F10H2-F 8H2 monolayers and pure monolayers on Au as a function of the molar fraction $x_{F10H2}$ of the F10H2 chain in the monolayer. The solid curve and the dashed curve are model curves.
Figure 3:
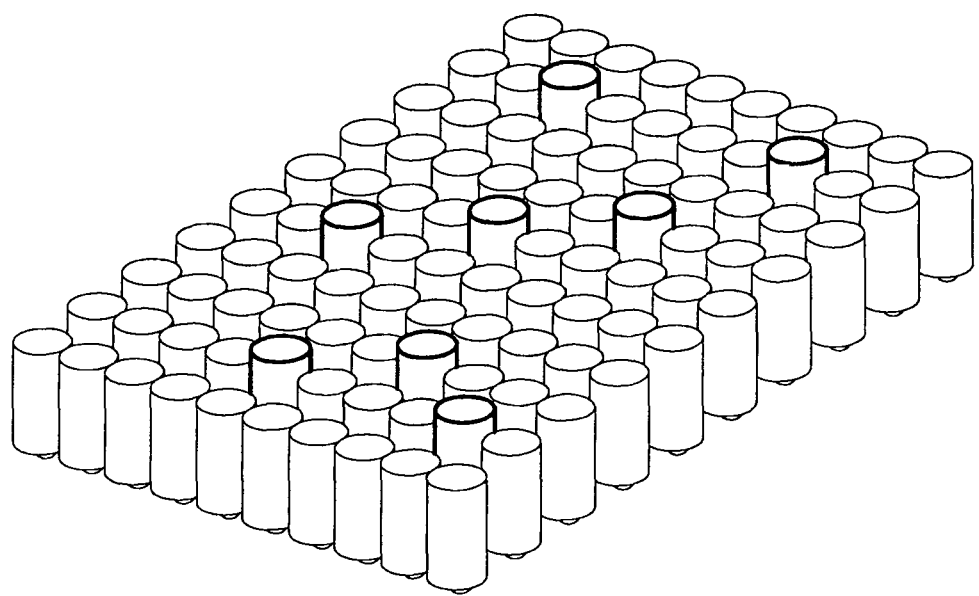
FIG. 3 is as schematic illustration of the idealized structure of binary mixed monolayers of F10H2 and F8H2 chains on Au(111). The tilt angle of the perfluorocarbon chains is 25° with respect to the surface normal. The spacing between nearest neighbors in the closest-packed array is 5.8 Å. The height difference between F10H2 and F8H2 chains is 1.8 Å.

From FIG. 2 it is evident that the maximum advancing contact angle is achieved at an approximate equimolar ratio of F10H2 to F8H8 chains in the monolayer. The topography of the monolayer surface increases the advancing water contact angle from 115.8° and 116.0° for the pure F8H2 and F10H2 chains, respectively, by about 2° to 117.7° for a surface of an equimolar composition of the two thiolates in the monolayer. An increase of the advancing water contact angle by about 2° is considerable for binary layers consisting of molecules having a difference in length of their perfluoroalkyl chains of only 2 carbon atoms. Larger increases of contact angle are to be expected with rougher surfaces (i.e. a larger difference in chain length) according to the theories of R. N. Wenzel (Ind. Eng. Chem. 1936, is 28, 988).

What is claimed is:

1. A self-assembled monolayer formed on a substrate, comprising the substrate and at least two different molecules (1a) and (2a) each having a fluoroalkyl chain $F_3C$—$(CF_2)_m$—$(CH2)_n$— and an inorganic or organic moiety formed thereon, with m being an integer of from 3 to 36 and n being an integer independently selected from 0 to 40, wherein m in molecule (2a) is larger than m in molecule (1a) by at least 2, n is the same in molecules (1a) and (2a), and the molar ratio of molecules (1a) to (2a) in the monolayer is from 1:9 to 9:1, and wherein the inorganic or organic moiety of molecule (1a) is the same as the inorganic or organic moiety of molecule (2a).

2. The self-assembled monolayer according to claim 1, wherein m is an integer of from 3 to 33 and n is an integer of from 2 to 40.

3. The self-assembled monolayer according to claim 1, wherein molecules (1a) and (2a) comprise a fluoroalkyl chain $F_3C-(CF_2)_m-(CH_2)_n-$ linked to an inorganic or organic moiety which is the same in molecules (1a) and (2a).

4. The self-assembled monolayer according to claim 1, wherein the fluoroalkyl chains are linked to a O, S, Se, Te, C, Si, N, or P atom.

5. The self-assembled monolayer according to claim 1 obtainable by a process comprising applying to the substrate a liquid or gaseous composition including at least two different fluorinated compounds (1) and (2) according to the same generic formula:

$$F_3C-(CF_2)_m-(CH_2)_n-X$$

wherein:
- m is an integer of from 3 to 36, with the proviso that m in compound (2) is larger than m in molecule (1) by at least 2;
- n is an integer independently selected from 0 to 40; and
- X is a monovalent inorganic or organic moiety containing at least one functionality being capable of bonding to the substrate.

6. The self-assembled monolayer according to claim 1, wherein the substrate is selected from metals, ceramics, plastics, and glass.

7. The self-assembled monolayer according to claim 1, wherein the fluoroalkyl chain of molecules in the monolayer is linked to a S atom and the substrate is Au.

* * * * *